(12) United States Patent
Woolsey et al.

(10) Patent No.: US 8,015,415 B1
(45) Date of Patent: Sep. 6, 2011

(54) FORM COUNT LICENSING

(75) Inventors: Les G. Woolsey, Ottawa (CA); Mark Manca, Ottawa (CA); Rob McDougall, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1001 days.

(21) Appl. No.: 11/141,990

(22) Filed: May 31, 2005

(51) Int. Cl.
*G06F 11/30* (2006.01)

(52) U.S. Cl. .................. 713/189; 713/176; 713/188

(58) Field of Classification Search .................. 713/189
See application file for complete search history.

(56) References Cited

U.S. PATENT DOCUMENTS

| | | | |
|---|---|---|---|
| 6,185,569 B1 * | 2/2001 | East et al. | 707/101 |
| 6,701,308 B1 * | 3/2004 | Chen et al. | 707/3 |
| 7,120,651 B2 * | 10/2006 | Bamford et al. | 707/201 |
| 7,188,334 B1 * | 3/2007 | Sinclair | 717/114 |
| 7,281,018 B1 * | 10/2007 | Begun et al. | 707/102 |
| 2001/0051962 A1 * | 12/2001 | Plotkin | 707/522 |
| 2002/0049909 A1 * | 4/2002 | Jackson et al. | 713/188 |
| 2002/0184333 A1 * | 12/2002 | Appelman | 709/217 |
| 2003/0028774 A1 * | 2/2003 | Meka | 713/176 |
| 2003/0182142 A1 * | 9/2003 | Valenzuela et al. | 705/1 |
| 2003/0188174 A1 * | 10/2003 | Zisowski | 713/189 |
| 2005/0071640 A1 * | 3/2005 | Sprunk et al. | 713/176 |
| 2005/0131900 A1 * | 6/2005 | Palliyll et al. | 707/10 |
| 2005/0147946 A1 * | 7/2005 | Ramamurthy et al. | 434/118 |
| 2005/0259844 A1 * | 11/2005 | Kot et al. | 382/100 |
| 2006/0036612 A1 * | 2/2006 | Harrop et al. | 707/100 |
| 2006/0236111 A1 * | 10/2006 | Bodensjo et al. | 713/176 |

* cited by examiner

*Primary Examiner* — Nabil M El Hady
*Assistant Examiner* — Yonas Bayou
(74) *Attorney, Agent, or Firm* — Fish & Richardson P.C.

(57) ABSTRACT

The present invention provides methods and apparatus that implement techniques for detecting modifications of a form template. The techniques feature receiving a document containing a template definition, and receiving one or more modifications to the document. The techniques further feature identifying one or more data bind nodes within the template definition. The techniques also feature finding any corresponding predetermined hash associated with the document for each of the identified data bind nodes. The techniques additionally feature calculating a hash for each identified data bind node, and comparing the calculated hash for each identified data bind node with the corresponding predetermined hash. The techniques further feature flagging the document if either the calculated hash for each data bind node does not match up with the corresponding predetermined hash or if no corresponding predetermined hash exists for one or more of the data bind nodes.

23 Claims, 2 Drawing Sheets

FORM COUNT LICENSING

BACKGROUND

The present invention relates generally to data processing, and more particularly to detecting modifications of a form template.

Traditionally, attempts to monitor the use of form templates for licensing purposes involve counting the number of different form templates that a customer has used. No attempt is made to distinguish form templates that the customer has only modified in minor ways, as compared to form templates that have received major modifications. For example, modifications can range from cosmetic changes to the form, such as adding or modifying a graphical element of the form, to changing the functionality of the form.

However, such a system does not allow the customer to make minor modifications to form template without counting these changes towards the number of form templates used. The customer cannot perform minor modifications, such as correcting a typographical error on the form or changing a corporate logo on the form, without payment of an additional license fee.

SUMMARY

The present invention provides methods and apparatus that implement techniques for detecting modifications of a form template.

In one general aspect, the techniques feature receiving a document containing a template definition, and receiving one or more modifications to the document. The techniques further feature identifying one or more data bind nodes within the template definition. The techniques also feature finding any corresponding predetermined hash associated with the document for each of the identified data bind nodes. The techniques additionally feature calculating a hash for each identified data bind node, and comparing the calculated hash for each identified data bind node with the corresponding predetermined hash. The techniques further feature flagging the document if either the calculated hash for each data bind node does not match up with the corresponding predetermined hash or if no corresponding predetermined hash exists for one or more of the data bind nodes.

The invention can be implemented to include one or more of the following advantageous features. The template definition contained in the document may be executed, whether or not the document has been flagged. The document may be an XML (Extensible Markup Language) document. The data bind nodes may be XML bind nodes.

In another general aspect, the techniques feature a template repository storing one or more original templates. Each original template is an electronic document that contains one or more data binding elements, and each data binding element is a document element that includes a link to a respective external resource. Each data binding element in an original template has an original hash associated with and derived from the data binding element in the corresponding original template. The techniques also feature a template editor, where the template editor is a computer program installed on the data processing system. The template editor can create, copy, read, modify, and write templates for use by the template processor. The template editor can also interact with a user to receive and perform commands from the user to modify a template, including commands to add, modify, and delete data binding elements from the template. The template editor cannot derive an original hash for a modified or new data binding element. The techniques further feature a validation module, where the validation module can parse a first template in use by the system and identify every data binding element in the first template. The verification module can also calculate a verification hash for every data binding element in the first template, and identify the first template as being like-original if every data binding element in the first template is associated with an original hash that is identical to the verification hash calculated for the data binding element and identify the first template as being unlike-original if any data binding element in the first template lacks an association with an original hash that is identical to the verification hash calculated for the data binding element.

The invention can be implemented to include one or more of the following advantageous features. Like-original templates and unlike-original templates may be equally valid templates in the system. Unlike-original templates may be flagged by the validation module. The templates may be XML documents. The data binding elements may be XML data bind nodes. The links may comprise URLs (Uniform Resource Locators). The respective external resources may be data sources external to the system. The template editor may be installed on a client computer and the template repository may be installed on a server computer.

Particular embodiments of the invention can be implemented to realize one or more of the following advantages. Form templates can be protected to restrict major modifications from being made to the template. Minor modifications can be made to form templates without restrictions.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
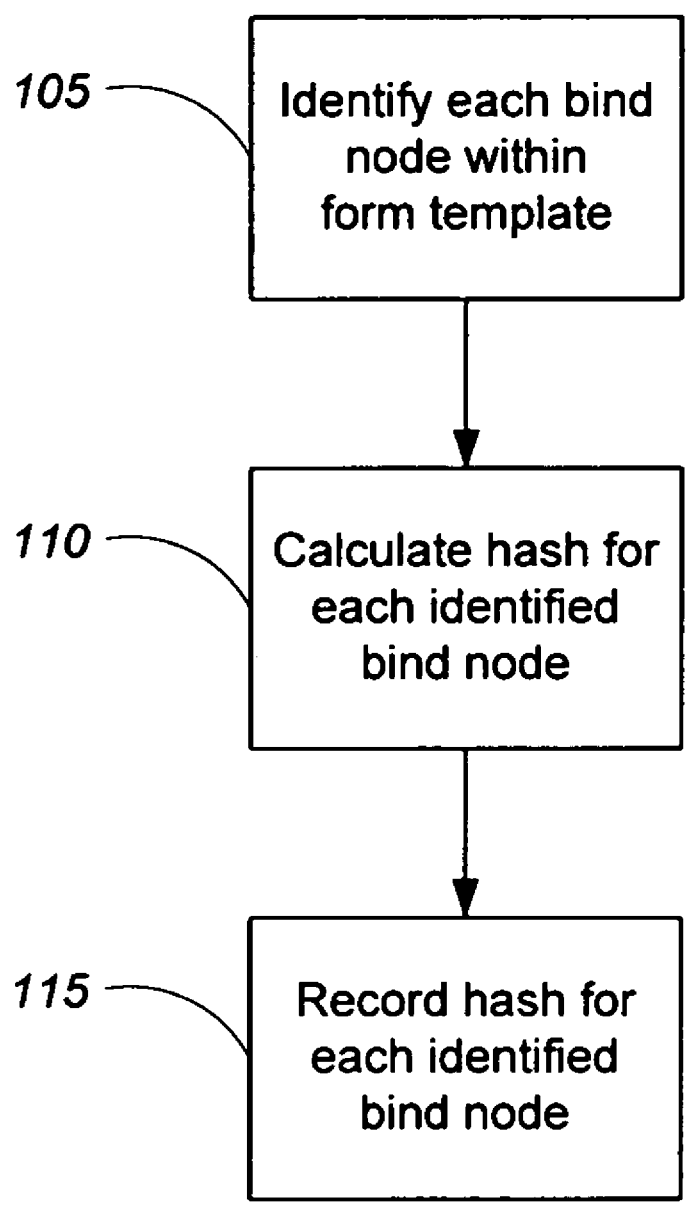
FIGS. 1A and 1B show flowcharts of a method for identifying major modifications to a form template.
Figure 1B:
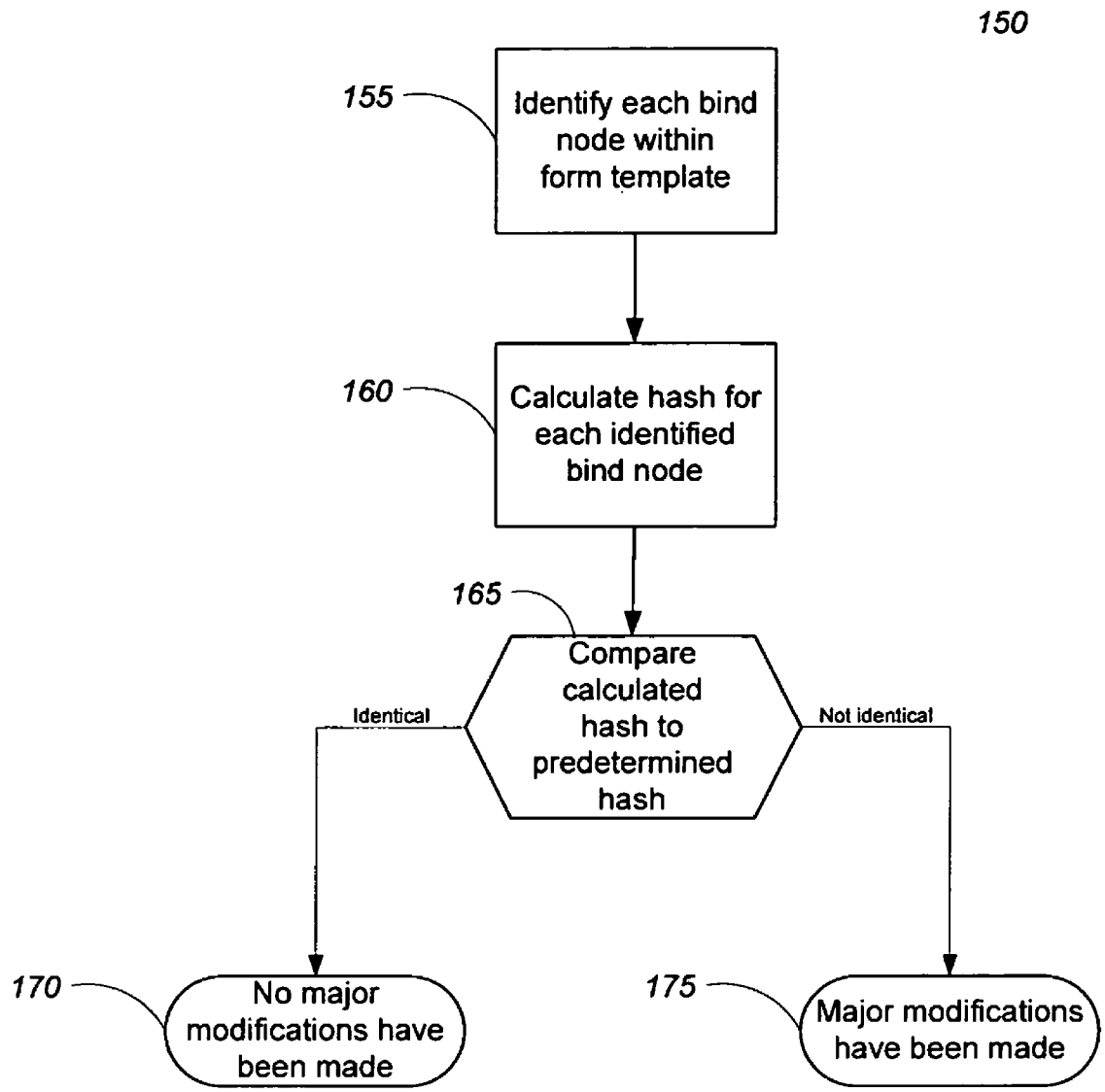

FIGS. 1A-1B shows a method used by a validation module for determining if a user has made any major modifications to a form template. In one implementation, the form template can be an Extensible Markup Language (XML) document. In one implementation, major modifications involve changes in or additions to data binding elements, where the data binding elements are bind nodes. Any modifications to the form template that are not considered to be major modifications are minor modifications. Minor modifications can include cosmetic changes to the form, e.g., modifying the text legends within the form or modifying graphics that are displayed as part of the form.

A template repository contains one or more form templates. In one implementation, the form templates within the template repository can be executed without requiring that an additional license be obtained or that an additional license fee be paid. However, if any major modifications are made to any of the form templates contained within the template repository, an additional license must be obtained or an additional license fee must be paid.

FIG. 1A shows a method 100 for protecting portions of a form template. First, each of the bind nodes within the form template is identified (step 105). A bind node is a link between one or more fields within the form and an external data source. As described above, any changes made to a bind node would be a major modification of the form template.

Next, a hash is calculated for each identified bind node within the form template (step 110). Any suitable hash function can be used, e.g., Message-Digest Algorithm 5 (MD5) or Secure Hash Algorithm 1 (SHA-1). The start and end of the input to the hash function is defined in advance. For example, in one implementation, the input to the hash function is the field name containing the bind node in addition to the contents of the bind node.

The hash for each identified bind node is recorded (step 115). In one implementation, the hash for each bind node is recorded within the form template. For example, the hash can be inserted as an attribute of a field node. In an additional implementation, the hash can be recorded as a processing instruction within the form template. Alternatively, the hash for each bind node may be stored in a separate location that is associated with the form template.

In an alternative implementation, major modifications include any changes to the functionality of the form template. Under such an implementation, particular classes of nodes are identified for which any edits or additions represent major modifications. As above, each of the nodes within the particular class is identified, and a hash is calculated for each of these nodes. The hashes are then associated with the form template as described above.

At this point, the protected form template can be distributed to users. The user has the ability to make modifications, additions, or deletions to any part of the protected form template, including portions of the form template for which hashes have been calculated. In one implementation, a template editor can be provided. The template editor provides an interface where the user can make modifications, additions, or deletions to any part of the protected form template.

FIG. 1B shows a method 150 for determining if any major modifications have been made to the protected form template. First, each of the bind nodes within the form template is identified (step 155). A hash is calculated for each identified bind node within the form template (step 160). The hash function used must be the same as that originally used during the protection of the form template. In addition, the input to the hash function must be well defined, and use the same definition as that originally used during the protection of the form template.

For each bind node, the calculated hash is compared to the predetermined hash stored in the protected form template (step 165). If each calculated hash is identical to the predetermined hash, no major modifications have been made to the form template (step 170). If a calculated hash is not identical to its respective predetermined hash, or if no predetermined hash exists for a particular bind node, at least one major modification has been made to the form template since the time the form template was originally protected (step 175).

Under such a system, if a user makes a change to a bind node, the form template will be flagged as having a major modification, as the hash of the changed bind node will not be identical to the hash of the original bind node. In addition, if a user adds an additional bind node, no predetermined hash will exist for this new bind node, causing the system to flag the form template as having a major modification.

In one implementation, if the user chooses to delete one or more bind nodes, this is not treated as a major modification. The deleted bind node will not be subjected to the hash comparison, as it no longer exists within the form template. Therefore, the form template will not be flagged as having a major modification. In an alternate implementation, deleted bind nodes can be treated as a major modification. Information about the bind nodes, such as the number of bind nodes, can be associated with the form template at the time the form template is protected. This information can then be used to detect if a bind node has been deleted by the user.

In one implementation, the form template can be executed whether or not a major modification in the form template has been identified. If desired, an alert that a major modification has taken place can be presented to the user at the time of execution. In an alternative implementation, the form template cannot be executed if a major modification has been identified unless an additional license for the form template has been obtained.

In another implementation, where particular classes of nodes are identified for which any edits or additions represent major modifications, each of the particular classes of nodes is identified in the form template. A hash is calculated for each of the identified nodes, and the calculated hash is compared to the predetermined hash. As above, if each calculated hash is identical to the predetermined hash, no major modifications have been made to the form template. If a calculated hash is not identical to its respective predetermined hash, or if no predetermined hash exists for an identified node, at least one major modification has been made to the form template since the time the form template was originally protected.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in an information carrier, comprising instructions operable to cause a computer to:
   receive a document containing a template definition, the template definition including data bind nodes and identifying at least one of multiple data bind node classes;
   receive one or more modifications to the template definition, wherein the modification is a major modification at least if it edits or adds any data bind node having the identified data bind node class, and wherein the modification is a minor modification if it does not edit or add any data bind node having the identified data bind node class;
   identify one or more of the data bind nodes within the template definition having the identified data bind node class;
   find, for each identified data bind node, any corresponding predetermined hash previously calculated based on content of the corresponding identified data bind node;
   calculate a separate hash for each identified data bind node;
   compare the calculated separate hash for each identified data bind node with the corresponding predetermined hash; and
   flag the document as having the major modification at least if either the calculated separate hash for a data bind node does not match up with the corresponding predetermined hash or if no corresponding predetermined hash exists for one or more of the data bind nodes, wherein the minor modification does not cause the document to be flagged,
   wherein each data bind node comprises a link between at least one field in the document and an external data source.

2. The computer program product of claim 1, further comprising instructions operable to cause a computer to:
   execute the template definition contained in the document, whether or not the document has been flagged.

3. The computer program product of claim 1, wherein the document is an XML (Extensible Markup Language) document.

4. The computer program product of claim 1, wherein the one or more data bind nodes are XML (Extensible Markup Language) data bind nodes.

5. A method comprising:
   receive, in a computer system, a document containing a template definition, the template definition including data bind nodes and identifying at least one of multiple data bind node classes;
   receive, in the computer system, one or more modifications to the template definition, wherein the modification is a major modification at least if it edits or adds any data bind node having the identified data bind node class, and wherein the modification is a minor modification if it does not edit or add any data bind node having the identified data bind node class;
   identify, using the computer system, one or more of the data bind nodes within the template definition having the identified data bind node class;
   find, using the computer system and for each identified data bind node, any corresponding predetermined hash previously calculated based on content of the corresponding identified data bind node;
   calculate, using the computer system, a separate hash for each identified data bind node;
   compare, using the computer system, the calculated separate hash for each identified data bind node with the corresponding predetermined hash; and
   flag, using the computer system, the document as having the major modification at least if either the calculated separate hash for a data bind node does not match up with the corresponding predetermined hash or if no corresponding predetermined hash exists for one or more of the data bind nodes, wherein the minor modification does not cause the document to be flagged,
   wherein each data bind node comprises a link between at least one field in the document and an external data source.

6. The method of claim 5, further comprising:
   executing the template definition contained in the document, whether or not the document has been flagged.

7. The method of claim 5, wherein the document is an XML (Extensible Markup Language) document.

8. The method of claim 5, wherein the one or more data bind nodes are XML (Extensible Markup Language) data bind nodes.

9. A data processing system, comprising:
- a template repository storing one or more original templates, each original template being an electronic document that contains one or more data binding elements, each data binding element being a document element that includes a link to a respective external resource, the template definition identifying at least one of multiple data bind node classes, each data binding element in an original template having an original hash associated with the data binding element and derived from content of the data binding element in the corresponding original template;
- a template editor, the template editor being a computer program installed on the data processing system, the template editor being operable to create, copy, read, modify, and write templates for use by the template processor, the template editor being further operable to interact with a user to receive and perform commands from the user to modify a template, including commands to add, modify, and delete data binding elements from the template, wherein a modification is a major modification at least if it edits or adds any data bind node having the identified data bind node class, and wherein the modification is a minor modification if it does not edit or add any data bind node having the identified data bind node class, wherein the template editor is not operable to derive an original hash for a modified or new data binding element; and
- a validation module, the validation module being operable to parse a first template in use by the system, to identify every data binding element in the first template having the identified data bind node class, to calculate a separate verification hash for every data binding element in the first template, and to identify the first template as having the minor modification if every data binding element in the first template having the identified data bind node class is associated with an original hash that is identical to the separate verification hash calculated for the data binding element and identify the first template as having the major modification at least if any data binding element in the first template lacks an association with an original hash that is identical to the separate verification hash calculated for the data binding element.

10. The system of claim 9, wherein like-original templates and unlike-original templates are equally valid templates in the system.

11. The system of claim 10, wherein unlike-original templates are flagged by the validation module.

12. The system of claim 9, wherein the templates are XML (Extensible Markup Language) documents.

13. The system of claim 9, wherein the one or more data binding elements are XML (Extensible Markup Language) data bind nodes.

14. The system of claim 9, wherein each link of a data binding element comprises a Uniform Resource Locator (URL).

15. The system of claim 9, wherein the respective external resource for a link is a data source external to the system.

16. The system of claim 9, wherein the template editor is installed on a client computer and the template repository is installed on a server computer.

17. A system comprising:
- a document including a template definition stored on a storage device, the template definition including data bind nodes and identifying at least one of multiple data bind node classes; and
- a computing system including processor electronics configured to perform operations comprising:
    - receiving one or more modifications to the template definition, wherein the modification is a major modification at least if it edits or adds any data bind node having the identified data bind node class, and wherein the modification is a minor modification if it does not edit or add any data bind node having the identified data bind node class;
    - identifying one or more of the data bind nodes within the template definition having the identified data bind node class;
    - locating, for each identified data bind node, any corresponding predetermined hash previously calculated based on content of the corresponding identified data bind node;
    - calculating a separate hash for each identified data bind node;
    - comparing the calculated separate hash for each identified data bind node with the corresponding predetermined hash; and
    - flagging the document as having the major modification at least if either the calculated separate hash for a data bind node does not match up with the corresponding predetermined hash or if no corresponding predetermined hash exists for one or more of the data bind nodes, wherein the minor modification does not cause the document to be flagged,
    - wherein each data bind node comprises a link between at least one field in the document and an external data source.

18. The system of claim 17, wherein the processor electronics are further configured to perform operations comprising:
- executing the template definition contained in the document, whether or not the document has been flagged.

19. The system of claim 17, wherein the document comprises an XML (Extensible Markup Language) document.

20. The system of claim 17, wherein the one or more data bind nodes comprise XML (Extensible Markup Language) data bind nodes.

21. The computer program product of claim 1, further comprising instructions operable to cause a computer to:
- retrieve at least one corresponding predetermined hash from a location external to the document.

22. The method of claim 5, further comprising:
- retrieving at least one corresponding predetermined hash from a location external to the document.

23. The system of claim 17, wherein the processor electronics are further configured to perform operations comprising:
- retrieving at least one corresponding predetermined hash from a location external to the document.

* * * * *